Sept. 19, 1967  R. V. LEVETAN  3,342,848
N,N'-DIALKYL-N,N'-DICYANOALKYL-O-PHTHALAMIDES
Filed Feb. 11, 1965
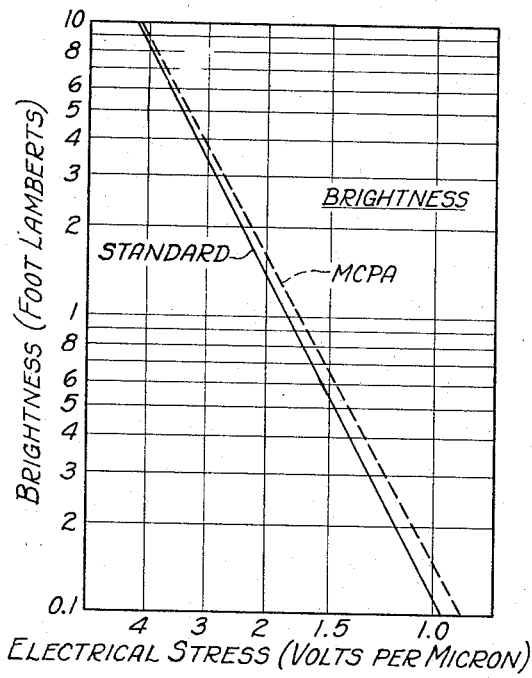
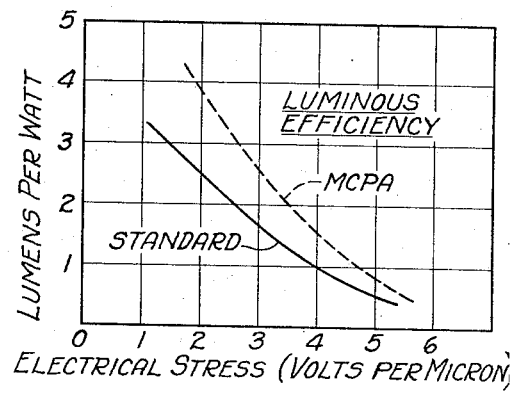
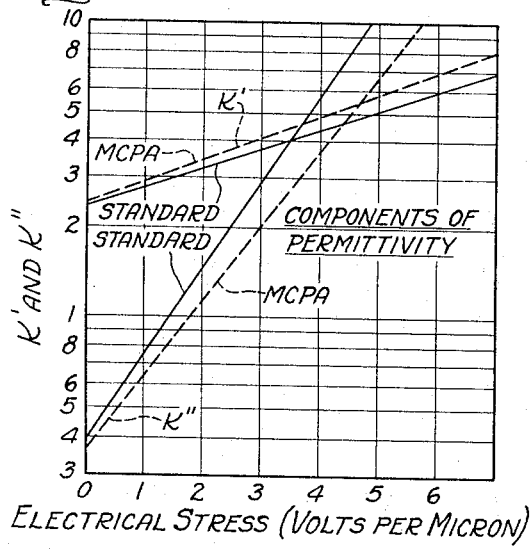
Inventor:
Robert V. Levetan
by *Richard H. Burgess*
His Attorney United States Patent Office 3,342,848
Patented Sept. 19, 1967

3,342,848
N,N'-DIALKYL-N,N'-DICYANOALKYL-o-
PHTHALAMIDES
Robert V. Levetan, Solon, Ohio, assignor to General
Electric Company, a corporation of New York
Filed Feb. 11, 1965, Ser. No. 431,870
2 Claims. (Cl. 260—465)

This invention relates to new organic compounds of the phthalamide class suitable for use as plasticizers or as oils or fluids having high dielectric constants. These compounds are valuable as high temperature lubricants, as electrical fluids of high dielectric constant and low power factor for use as transformer oils and as impregnants in electrical capacitors, and as plasticizers for plastic films used in capacitors. They are particularly useful for increasing the dielectric constant of the organic plastic matrix in which the phosphor and other constituents of an electroluminescent cell are embedded.

In general, the principles of application of compounds of the invention are described in application Ser. No. 189,095, filed Apr. 20, 1962, by Jaffe and Levetan, and Patent 2,951,865 to Jaffe and Levetan, entitled, "High Dielectric Constant Fluids and Plasticizers," both assigned to the assignee of the present application.

There is a continuing need in electrical applications generally, and especially in electroluminescence, for oils and plasticizers having ever higher dielectric constants and lower power factors.

It is therefore an object of the present invention to provide novel compounds having such desirable characteristic of high dielectric constant and low power factor. It is a further object of the present invention to provide such compounds that are compatible with the binders used in electroluminescent lamps such as cyanoethylated polyglucosides.

Briefly stated, the present invention generally provides a fluid compound which is referred to as N,N'-dialkyl-N,N'-dicyanoalkyl-o-phthalamide, wherein each alkyl is selected from the group consisting of the saturated alkyls having from one to four carbon atoms. This compound is generally represented by the formula:

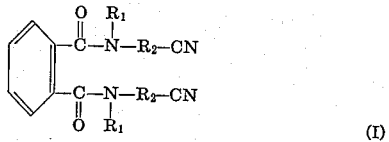

(I)

wherein $R_1$ is an alkyl selected from the group consisting of $CH_3$, $C_2H_5$, $C_3H_7$, $C_4H_9$, and $R_2$ is an alkylene selected from the group consisting of $CH_2$, $C_2H_4$, $C_3H_6$, and $C_4H_8$. In a preferred embodiment the invention provides the compound N,N'-dimethyl-N,N'-dicyanoethyl-o-phthalamide (MCPA) represented by the formula:

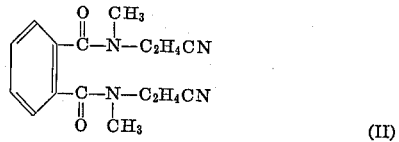

(II)

Further, a method is provided for preparing this MCPA compound which comprises reacting together N-methylaminopropionitrile with o-phthaloyl chloride in a dry solvent. More particularly, the amide is prepared by reacting a cooled, stirred mixture of N-methylaminopropionitrile, and an acid acceptor such as pyridine, benzyldimethylamine, or other stable tertiary amine, in a dry solvent such as chloroform or methylenechloride, with o-phthaloyl chloride while excluding atmospheric moisture. The resultant solution is purified by successive extractions such as with water, dilute acid and dilute base solutions, and thoroughly dried. The solvent is stripped off and the product is vacuum distilled. The diamide was characterized electrically and by infrared spectra. Other compounds of the invention can be produced by equivalent methods in which the R groups in (I) are varied so that $R_1=CH_3$, $C_2H_5$, $C_3H_7$, $C_4H_9$ or $C_nH_{2n+1}$, and $R_2=CH_2$, $C_2H_4$, $C_3H_6$, $C_4H_8$ or $C_nH_{2n}$, with $n$ in each case being equal to or less than four. Other methods such as cyanoethylation of substituted o-phthalamides can also be used to produce the above products.

At room temperature, MCPA and its homologues are viscous fluids compatible with cyanoethyl cellulose, which is commercially used in electroluminescent lamps, and which fluids also aid in the efficient uniform dispersion of zinc sulfide phosphors in a matrix in which the said fluids and cyanoethyl cellulose acts as a binder and actually constitute the matrix material. The combination of these properties is of basic importance to the production of bright efficient commercially practical electroluminescent lamps. Whereas it is desirable that the high dielectric constant materials used as plasticizers be fluids soluble in the plastic binders of electroluminescent lamps and stable such that they do not tend to crystallize on long standing, this property would not necessarily be expected to phthalamides or substituted phthalamides. Even such similar compounds as N,N,N',N'-tetramethyl-phthalamide and N,N'-diethyl, N',N'-dimethyl-phthalamide are crystalline solids at room temperature, and N,N,N',N'-tetracyanoethyl-p-phthalamide melts at 149° C. Therefore, it could not be predicted that the particular substituted phthalamides of the present invention would have the desired fluid properties.

In the drawing, FIGS. 1, 2 and 3 are charts which compare the electrical and luminous properties of electroluminescent lamps prepared with a compound of the invention with those propeties of another plasticizer used commercially in electroluminescent lamps and claimed in the above-mentioned Patent 2,951,865, di-α-cyanoethyl phthalate (α-CNEP), represented structurally by the formula:

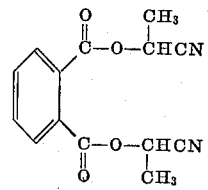

The measurements represented in FIGS. 1 and 2 were made on standard plastic electroluminescent lamps such as those described in the above-mentioned application Ser. No. 189,095 having a phosphor layer thickness of about 0.001 inch and being tested with an electric power supply at a frequency of 60 cycles per second.

FIG. 1 compares the brightness in foot-lamberts of lamps made with MCPA with that of otherwise equivalent lamps made with CNEP (identified as "standard") as a function of electrical stress measured in volts per micron thickness of the phosphor layer. As can be determined from the figure, lamps made with MCPA are about 20% brighter than CNEP lamps with an electrical stress of about 1.75 volts per micron.

FIG. 2 compares the luminous efficiency of these same MCPA and CNEP lamps in terms of lumens per watt measured over a range of electrical stress. Again, MCPA is significantly superior to CNEP, in this instance in its greater luminous efficiency.

FIG. 3 is a comparison of the real component of permittivity K', which is the dielectric constant, and the loss or imaginary component of permittivity, K" as a function of electrical stress. MCPA has a substantially higher real component of permittivity than has CNEP. MCPA also has a lower average loss component of permittivity than CNEP, thus indicating that lamps using MCPA would be more efficient in the conversion of electrical energy input into light and would heat up less than would lamps using CNEP. These properties are also valuable in capacitors and other applications.

When plasticizers are used in substantial amounts to formulate plastics in combination with resins as is often the case with electroluminescent lamps, physical properties such as the dielectric constant of the plasticizer are quite important in determining the characteristics of the plasticized resin. For this reason, it is especially important that plasticizers used in electroluminescent lamps have desirable electrical characteristics of high dielectric constant and low dielectric loss.

For a material to have a high dielectric constant it is quite desirable that the polar groups have a high degree of asymmetry in relation to the non-polar portions of the molecule. Ortho compounds are superior in this regard to meta compounds which, in turn, are superior to para compounds. Apparently, the branched alkyl amide chain in the compounds of the invention provide the highly polarizable structure that is necessary for producing the desired high dielectric constant of the compound.

Electrical measurements have been made on MCPA at a voltage of 120 R.M.S. and are compared in Table I below with similar measurements on β-CNEP and α-CNEP, described in Patent 2,951,865.

TABLE I.—ELECTRICAL CHARACTERISTICS

| Compound | K' | K'' | Tan δ | Power Factor |
|---|---|---|---|---|
| β-CNEP | 18.0 | 9.1 | 0.506 | 0.45 |
| α-CNEP | 23.8 | 1.19 | 0.050 | 0.050 |
| MCPA | 27.3 | 0.92 | 0.034 | 0.034 |

K'=real component of permittivity.
K''=imaginary or loss component of permittivity.
Tangent δ=K'' divided by K'.

The data of this table, which were obtained on the compounds as such rather than in electroluminescent cells, indicate the superiority in certain electrical characteristics of MCPA over both α-CNEP and β-CNEP. These properties apply to the usefulness of MCPA in various types of electrical devices including electroluminescent lamps.

Table II presents comparative data on luminous characteristics of electroluminescent cells made in the same manner with the only essential difference being that one used MCPA and the other used α-CNEP as the plasticizer for the matrix material in the phosphor layer of the electroluminescent cell. B max. is the maximum brightness of the lamp occurring during the initial 24 hours of operation, and the Half Life is the time in hours to reach one-half of B max.

TABLE II.—LUMINOUS CHARACTERISTICS

| Plasticizer | B max. | Half Life (Hrs.) |
|---|---|---|
| MCPA | 5.91 | 2,110 |
| α-CNEP | 5.52 | 1,565 |

FIGS. 1, 2 and 3 of the drawing, previously discussed, allow direct comparisons of over-all effective electrical properties by comparing electroluminescent lamps made with MCPA and with α-CNEP at equal electrical stress. The figures illustrate the improvements over α-CNEP with MCPA at electrical working stress including the normal range of from 3 to 5 volts per micron. The brightness and the efficiency are significantly improved as direct results of increased dielectric constant and lower dielectric loss.

As an example of a method of preparing MCPA according to the invention, one specific method will now be described.

*Preparation of N,N'-dimethyl-N,N'-dicyanoethyl-o-phthalamide*

0.416 mole of β-methylaminopropionitrile, 0.501 mole of anhydrous pyridine and 100 ml. of anhydrous chloroform were cooled to −28° C. in the reaction vessel. 0.208 mole of phthaloyl chloride in 100 ml. of anhydrous chloroform were added to the mixture in the reaction vessel over a period of 55 minutes. Agitation was continuous throughout the phthaloyl chloride addition time, and the pot temperature was maintained at −14° to −28° C. After all of the phthaloyl chloride had been added, the reaction solution was allowed to warm to room temperature and was left overnight. The solution was extracted sequentially with distilled water twice, 10% by volume $H_2SO_4$ five times, distilled water once, 10% by weight $K_2CO_3$ five times, and saturated NaCl twice. The product solution was then filtered through 8-14 mesh activated alumina and dried over anhydrous sodium sulfate. The solvent (chloroform) was then distilled off until the pot temperature reached 110° C. The solution was then put into a Hickman still, the pressure gradually decreased and the temperature gradually increased until distillation began. The product distilled between 200 and 215° C. at a pressure of about one micron.

The β-methylaminopropionitrile ingredient of the reaction may be made as follows:

A 30% by weight aqueous solution of methylamine containing 2.0 moles of amine is cooled to about 1° C. and held cold while 1.5 moles of acrylonitrile is added slowly with constant stirring. The reaction mixture is allowed to come to room temperature (about 23° C.), held for several hours, then with continuous agitation, it is heated to 90° C. over a period of 90 minutes, and allowed to stand overnight at room temperature. The aqueous phase is separated by the addition of potassium carbonate, the product dried over anhydrous sodium sulfate, and the dry product purified by distillation at 2–10 mm. pressure. This yield 50–55 grams of β-methylaminopropionitrile.

While specific examples have been given of the compounds and methods of preparation of the compounds of the invention, it will be understood that various changes, omissions and substitutions may be made within the spirit and scope of the invention as defined in the appended claims.

What I claim as new and desire to secure by Letters Patent of the United States is:

1. A compound represented by the formula:

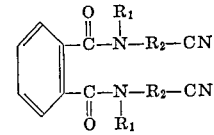

wherein $R_1$ is alkyl of one to four carbon atoms and $R_2$ is alkylene of one to four carbon atoms.

2. N,N'-dimethyl - N,N' - dicyanoethyl-o-phthalamide represented by the formula:

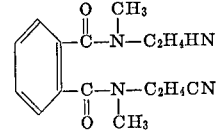

References Cited

UNITED STATES PATENTS

| | | | |
|---|---|---|---|
| 2,927,126 | 3/1960 | Pursglove | 260—465 |
| 2,951,865 | 9/1960 | Jaffe et al. | 260—465 |
| 3,036,112 | 5/1962 | Lynn | 260—465 |

OTHER REFERENCES

Bose et al.: C.A., 54, 1960, p. 24526c.

JOSEPH P. BRUST, *Primary Examiner.*